United States Patent
Guo

(10) Patent No.: US 10,373,787 B2
(45) Date of Patent: Aug. 6, 2019

(54) TEMPERATURE CONTROL APPARATUS AND LIQUID HEATER APPLYING THE APPARATUS

(71) Applicant: Guangdong Xinbao Electrical Appliances Holdings Co., Ltd., Foshan (CN)

(72) Inventor: Jiangang Guo, Foshan (CN)

(73) Assignee: Guangdong Xinbao Electrical Appliances Holdings Co., Ltd. (CN)

( * ) Notice: Subject to any disclaimer, the term of this patent is extended or adjusted under 35 U.S.C. 154(b) by 929 days.

(21) Appl. No.: 14/892,950

(22) PCT Filed: May 23, 2014

(86) PCT No.: PCT/CN2014/078353
§ 371 (c)(1),
(2) Date: Nov. 20, 2015

(87) PCT Pub. No.: WO2014/187372
PCT Pub. Date: Nov. 27, 2014

(65) Prior Publication Data
US 2016/0086752 A1    Mar. 24, 2016

(30) Foreign Application Priority Data

May 23, 2013  (CN) .......................... 2013 1 0196495
May 23, 2013  (CN) ..................... 2013 2 0288840 U

(51) Int. Cl.
*A47J 27/21* (2006.01)
*A47J 31/58* (2006.01)
(Continued)

(52) U.S. Cl.
CPC ........ *H01H 37/04* (2013.01); *A47J 27/21058* (2013.01); *A47J 27/21066* (2013.01); *A47J 27/21083* (2013.01); *A47J 27/21125* (2013.01)

(58) Field of Classification Search
None
See application file for complete search history.

(56) References Cited

U.S. PATENT DOCUMENTS 6,080,968 A * 6/2000 Taylor ............... A47J 27/21041
                                                      219/432
6,472,646 B1 * 10/2002 Taylor ............... A47J 27/21066
                                                      219/481

FOREIGN PATENT DOCUMENTS

CN       1300519 A     6/2001
CN     101354981 A     1/2009
(Continued)

OTHER PUBLICATIONS

International Search Report for Application No. PCT/CN2014/078353 dated Aug. 29, 2014.

*Primary Examiner* — Joseph M Pelham
(74) *Attorney, Agent, or Firm* — Lerner, David, Littenberg, Krumholz & Mentlik, LLP

(57) ABSTRACT

A temperature control apparatus has a housing and at least one thermosensitive protective action component. The thermosensitive protective action component has a metal actuator, an acting mechanism, a support frame, and a switch contact set. The metal actuator and the acting mechanism are both arranged on the support frame. The acting mechanism controls the on-off state of the switch contact set. The switch contact set is connected between the housing and the support frame. The switch contact set has a movable contact piece and a fixed contact piece. The temperature control apparatus also has a connecting component. The housing and the thermosensitive protective action component are flexibly connected therebetween via the connecting component. When the liquid heater is deformed as a result of a thermal shock, a great thermal contact can be maintained between (Continued)

the thermosensitive protective action component and a temperature sensing surface of the liquid heater.

10 Claims, 6 Drawing Sheets

(51) Int. Cl.
*G05D 23/10* (2006.01)
*H01H 37/04* (2006.01)

(56) References Cited

FOREIGN PATENT DOCUMENTS

| | | | |
|---|---|---|---|
| CN | 101634865 A | 1/2010 | |
| CN | 101727112 A | 6/2010 | |
| CN | 203311286 U | 11/2013 | |
| GB | 2372421 A * | 8/2002 | ........ A47J 27/21041 |
| GB | 2414160 A * | 11/2005 | ........ A47J 27/21125 |
| WO | WO 9948331 A1 * | 9/1999 | ........ A47J 27/21066 |
| WO | 2012164318 A2 | 12/2012 | |
| WO | WO 2014001755 A1 * | 1/2014 | .......... A47J 27/2105 |

\* cited by examiner

TEMPERATURE CONTROL APPARATUS AND LIQUID HEATER APPLYING THE APPARATUS

CROSS REFERENCE TO RELATED APPLICATIONS

The present application is a national phase entry under 35 U.S.C. § 371 of International Application No. PCT/CN2014/078353, filed May 23, 2014, which claims priority from Chinese Patent Application No. CN 201310196495.5, filed May 23, 2013, and Chinese Patent Application No. CN 201320288840.3, filed May 23, 2013, all of which are hereby incorporated by reference.

TECHNICAL FIELD

The present disclosure relates to a thermosensitive temperature control apparatus, and in particular to a thermosensitive temperature control apparatus for use in a 360 degree rotary liquid heater. In the meantime, the present disclosure further relates to a liquid heater using the apparatus.

TECHNICAL BACKGROUND

Liquid heater, in particular an electric kettle, usually requires a thermosensitive temperature control apparatus to control power-off protection of the liquid heater in the case of abnormal heating. The thermosensitive temperature control apparatus is usually mounted to an electric heater, so as to realize better thermal contact. According to market feedback on quality problems, when the product is first used, the performance is not influenced distinctly even when the product is still heated after water is dried. However, as the number of use increases, the heater would turn yellowish black due to slow temperature sensing, causing electric heating components to burn out. This is because the electric heater and the thermosensitive temperature control apparatus work under alternate cold and hot states, and inner stress and deformation of components mounted therein can be caused by the thermal shock. In this case, contact between the thermosensitive temperature control apparatus and the electric heater becomes under tightened due to the deformation. As a result, thermosensitivity of an overheating protection component is gradually reduced, rendering the product to fail and burn out. In design state, the thermosensitive temperature control apparatus is rigidly connected to the electric heater, and limit is realized through screw locking and a top surface of a support frame of the thermosensitive temperature control apparatus, so that a contact surface between the thermosensitive temperature control apparatus and the electric heater can become immobile after assembly. In the meantime, in order to eliminate bad contact caused by manufacture error, a product called "thermal conductive silicone grease" is usually coated on the thermalsensitive components in the thermosensitive temperature control apparatus in the existing technology, so that better thermal conduction can be realized. However, a temperature control apparatus and a heating tube of the electric kettle work in a misty environment, which is defined in safety standards as the third degree polluted environment, causing the "thermal conductive silicone grease" to age or dry. As a result, the sensing effect of the thermosensitive temperature control apparatus is influenced.

Therefore, in order to avoid product safety problem due to this reason, the national safety standards GB4706.19 prescribes requirement for 100 times of thermal shock tests. However, the deformation is closely related to the production technology, and is difficult to control during manufacturing of the product or be noticed during use of the product by a consumer. The above defects are hidden and hard to prevent.

SUMMARY OF THE INVENTION

Directed against the above problems, it is necessary to provide a safer, more reliable, and more implementable temperature control apparatus for use in a liquid heater according to the present disclosure.

A temperature control apparatus, comprising a housing and at least one set of thermosensitive protective action component, wherein the thermosensitive protective action component comprises a metal actuator, an acting mechanism, and a switch contact set. The acting mechanism controls an on-off state of the switch contact set. The switch contact set comprises a movable contact piece and a fixed contact piece. The temperature control apparatus further comprises a connecting component. The housing and the thermosensitive protective action component are flexibly connected with each other via the connecting component.

Further, the movable contact piece is disposed on the housing, and the fixed contact piece is disposed on the thermosensitive protective action component.

Further, the thermosensitive protective action component is provided with a shaft and the housing is provided with shaft sleeve, and the thermosensitive protective action component is in shaft joint with the housing through coordination between the shaft and the shaft sleeve.

Further, a sliding block is disposed on the thermosensitive protective action component and a slideway is disposed on the housing, wherein the sliding block is disposed in the slideway, so that the thermosensitive protective action component can move up and down relative to the housing.

Further, the housing is provided with no fewer than two limiting ribs, and blocking ribs are disposed on the thermosensitive protective action component at positions corresponding to the limiting ribs, wherein the limiting ribs coordinate with the blocking ribs, so that the thermosensitive protective action component has no fewer than two limiting positions.

Further, the thermosensitive protective action component comprises an elastomer, a part of the elastomer being fixed to the housing and an other part thereof being fixed to the thermosensitive protective action component.

Further, the elastomer is used for providing thrust to push the thermosensitive protective action component to a limiting position where it has good thermal contact with a temperature sensing surface of a liquid heater.

Further, the movable contact piece is elastic, so as to provide elastic support needed by the switch contact set within a scope of movement of the thermosensitive protective action component.

Further, the thermosensitive protective action component is provided with a positioning component, which is mounted near the metal actuator and used to bear force from the elastomer.

In addition, a liquid heater is provided according to the present disclosure, comprising a container and a base configured and arranged to coordinate with and heat the container, wherein said temperature control apparatus is mounted in a bottom of the container.

The housing and the thermosensitive protective action component of the temperature control apparatus according to the present disclosure are flexibly connected with each other, for example, in shaft joint or sliding joint, so that good thermal contact between the thermosensitive protective action component and a temperature sensing surface at a bottom of the container of the liquid heater can be guaranteed when deformation of the liquid heater occurs due to thermal shock, whereby reliability of temperature sensing can be ensured.

BRIEF DESCRIPTION OF THE DRAWINGS

The above is only an overview of the technical solution of the present disclosure. In order to describe the technical solution of the present disclosure more clearly, the accompanying drawings for illustrating the examples or the prior art will be described briefly. The drawings described herein only correspond to the examples of the present disclosure. Where necessary, an ordinary person skilled in the art can obtain other drawings based on the drawings of the present disclosure without creative work. In the drawings.

DETAILED DESCRIPTION OF THE EMBODIMENTS

In order to elaborate the technical solution for achieving a predetermined technical goal, the present disclosure will be clearly and comprehensively described in view of the accompanying drawings in the examples. Obviously, the examples described herein are only a part of the examples of the present disclosure. In addition, technical means or technical features in the examples of the present disclosure can be substituted if no creative work is required. The present disclosure will be described in detail based on the examples in view of the accompanying drawings.

Figure 1:
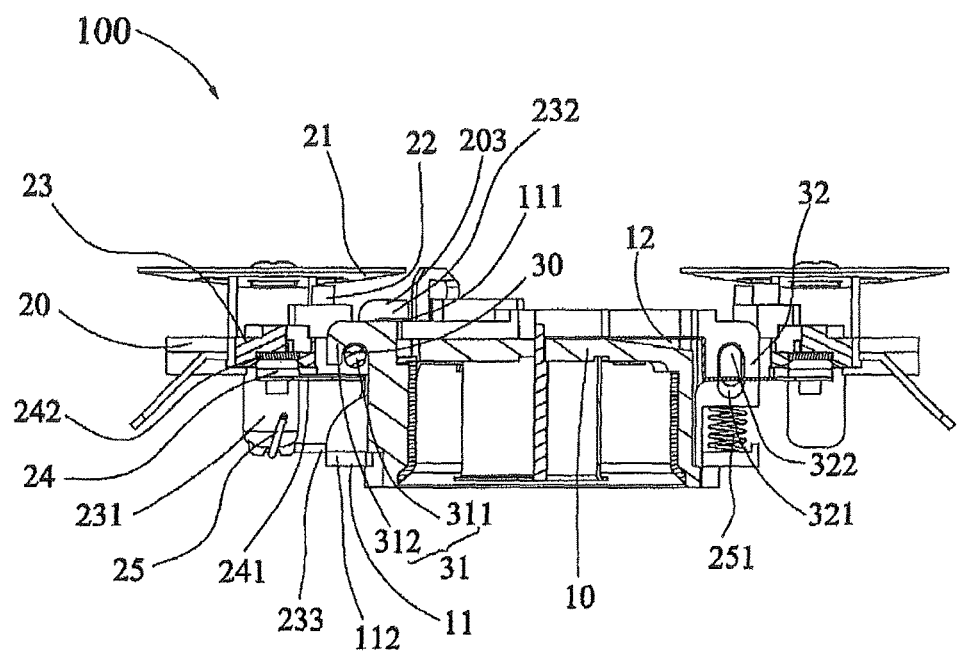
FIG. 1 schematically shows a structure of a temperature control apparatus according to a preferred example of the present disclosure, FIG. 2 schematically shows a top view of the temperature control apparatus according to a preferred example of the present disclosure, FIG. 3 schematically shows an inverted view of the temperature control apparatus according to a preferred example of the present disclosure, FIG. 4 schematically shows a bottom view of the temperature control apparatus according to a preferred example of the present disclosure, FIG. 5 schematically shows a limiting position of a thermosensitive protective action component in the temperature control apparatus according to the present disclosure, and FIG. 6 schematically shows another limiting position of the thermosensitive protective action component in the temperature control apparatus according to the present disclosure.
Figure 2:
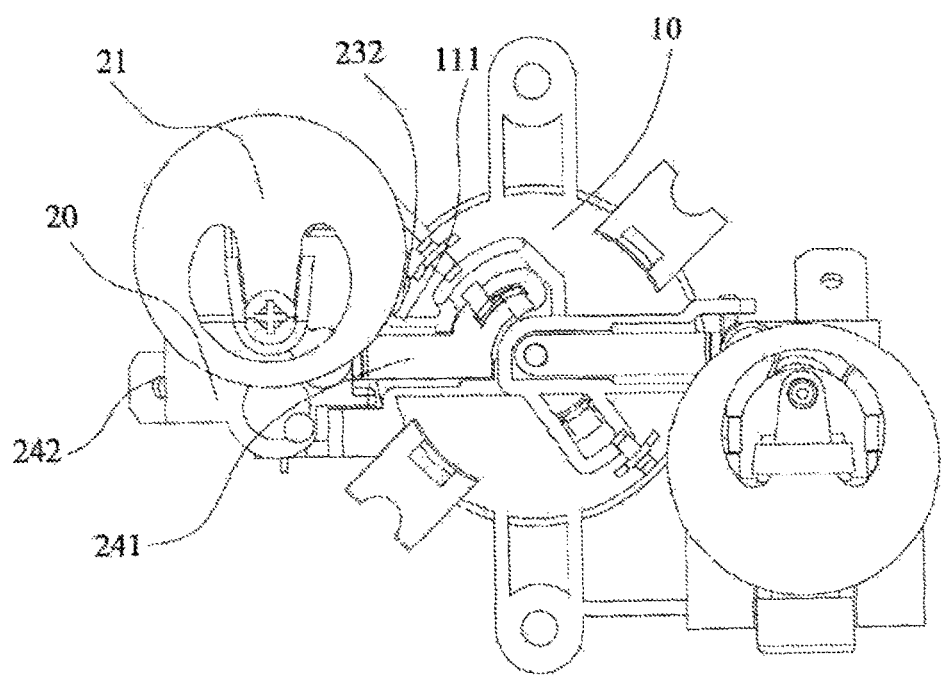

As shown in FIG. 1 and FIG. 2, a temperature control apparatus 100 according to a preferred example of the present disclosure is disposed at a bottom of a container of a liquid heater, such as an electric kettle, so that abnormal heating of the liquid heater can be promptly detected. The temperature control apparatus 100 comprises a housing 10, at least one set of thermosensitive protective action component 20, and a connecting component 30. The housing 10 and the thermosensitive protective action component 20 are flexibly connected with each other via the connecting component 30.

The connecting component 30 can be a shaft connecting component 31, or a sliding connecting component 32, or any other component that can flexibly connect the housing 10 with the thermosensitive protective action component 20. In the present example, two sets of thermosensitive protective action component 20 are provided. One set of thermosensitive protective action component 20 is connected with the housing 10 through a shaft connecting component 31 (as shown in a left half portion of FIG. 1), and the other set of thermosensitive protective action component 20 is connected with the housing 10 through a sliding connecting component 32 (as shown in a right half portion of FIG. 1).

As shown in the left half portion of FIG. 1, the shaft connecting component 31 comprises a shaft 311 disposed on the thermosensitive protective action component 20 and a shaft sleeve 312 disposed on the housing 10. The thermosensitive protective action component 20 and the housing 10 can rotate relative to each other through coordination between the shaft 311 and the shaft sleeve 312.

The housing 10 is fixedly connected with a bottom of the container of the liquid heater. The housing 10 is provided with no fewer than two limiting ribs 11 protruding at a side thereof near the thermosensitive protective action component 20. The limiting ribs 11 coordinate with the thermosensitive protective action component 20, so that the thermosensitive protective action component 20 has limiting positions, the number of which corresponds to that of the limiting ribs 11. According to the present example, a first limiting rib 111 and a second limiting rib 112 are respectively disposed at an upper and a lower end of a side of the housing 10 that is near the thermosensitive protective action component 20. The first limiting rib 111 and the second limiting rib 112 are used to limit movement of the thermosensitive protective action component 20 within two limiting positions.

The thermosensitive protective action component 20 comprises a metal actuator 21, an acting mechanism 22, a support frame 23 a switch contact set 24, and an elastomer 25.

The metal actuator 21 and the acting mechanism 22 are both disposed on the support frame 23. The acting mechanism 22 can move up and down relative to the support frame 23, and the metal actuator 21 is in clearance fit with the acting mechanism 22. When the metal actuator 21 acts, the acting mechanism 22 contacts an acting side (not shown) of the metal actuator 21 and bears force, so that the acting mechanism 22 which is disposed on the support frame 23 can be driven to act.

A convex column 231 is disposed on the support frame 23 at an end thereof opposite to the metal actuator 21. A groove (not shown) is formed on a bottom of the convex column 231 for coordinating with the elastomer 25. Blocking ribs 203 are disposed on the support frame 23 at positions corresponding to the limiting ribs 11. The blocking ribs 203 coordinate with the limiting ribs 11, so that the thermosensitive protective action component 20 has no fewer than two limiting positions. According to the present example, a first blocking rib 232 and a second blocking rib 233 are disposed on the support frame 23 at positions respectively corresponding to the first limiting rib 111 and the second limiting rib 112. The first blocking rib 232 and the second blocking rib 233 coordinate with the first limiting rib 111 and the second limiting rib 112, so that the thermosensitive protective action component 20 can be limited to move between the two limiting positions formed by the two limiting ribs 11.

The acting mechanism 22 is used for enabling the switch contact set 24.

The switch contact set 24 comprises a movable contact piece 241 and a fixed contact piece 242. The movable contact piece 241 is disposed on the housing 10 and extends towards the thermosensitive protective action component 20, and the fixed contact piece 242 is disposed on an end of the support frame 23 of the thermosensitive protective action component 20 that is opposite to the metal actuator 21. An end of the acting mechanism 22 that is opposite to the metal actuator 21 is in contact with the movable contact piece 241. The movable contact piece 241 has elasticity, and possesses certain precompression when in contact with the fixed contact piece 242, thereby providing elastic support needed by the switch contact set 24 in a scope of movement of the thermosensitive protective action component 20.

The elastomer 25 is used for providing thrust for pushing the thermosensitive protective action component 20 to a limiting position where it can have good thermal contact with the temperature sensing surface of the liquid heater when the temperature control apparatus 100 is mounted or a temperature sensing surface of a liquid heater deforms.

Figure 3:
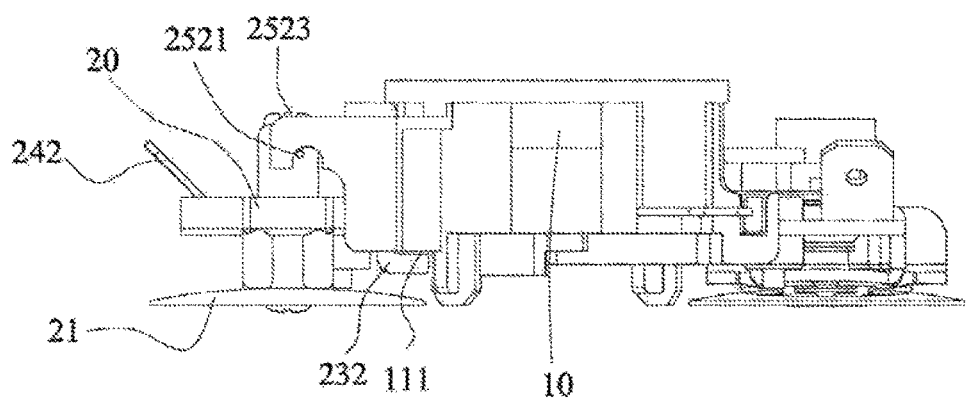
Figure 4:
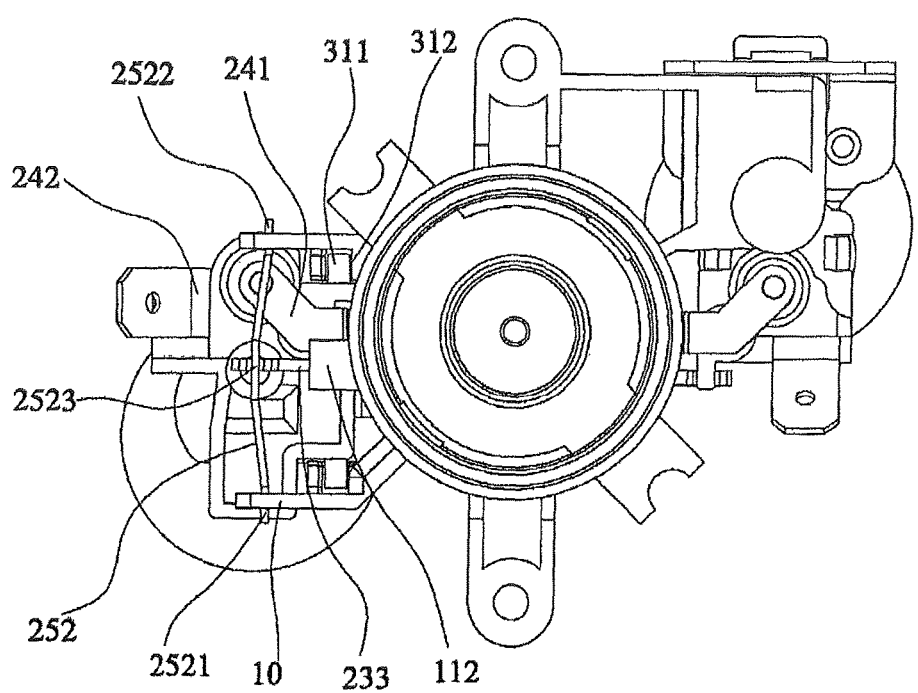

In view of FIGS. 3 and 4, the elastomer 25 is a spring steel wire 252. Both ends (2521, 2522) of the spring steel wire 252 are fixedly connected to the housing 10, and an intermediate section 2523 thereof is disposed in the groove and fixedly connected to the support frame 23 of the thermosensitive protective action component 20.

FIG. 1 shows a right half portion of the temperature control apparatus 100. The housing 10 is connected with the thermosensitive protective action component 20 via the sliding connecting component 32. The elastomer 25 can be a spring 251. The scope of movement of the thermosensitive protective action component 20 can be limited by the sliding connecting component 32.

The thermosensitive protective action component 20 moves up and down relative to the housing 10 via the sliding connecting component 32. The sliding connecting component 32 comprises a slideway 321 disposed on the housing 10 and a sliding block 322 disposed on the thermosensitive protective action component 20. The slideway 321 is vertically arranged, and the sliding block 322 is disposed in the slideway 321 and able to slide for a predetermined distance along the slideway 321. The slideway 321 is in frictional contact with the sliding block 322.

An end of the movable contact piece 241 stretches into the housing 10 and is fixedly connected with the housing 10, and an other end thereof abuts against the fixed contact piece 242. A cavity 12 is formed in the housing 10. A part of the movable contact piece 241 is accommodated in the cavity 12.

Figure 5:
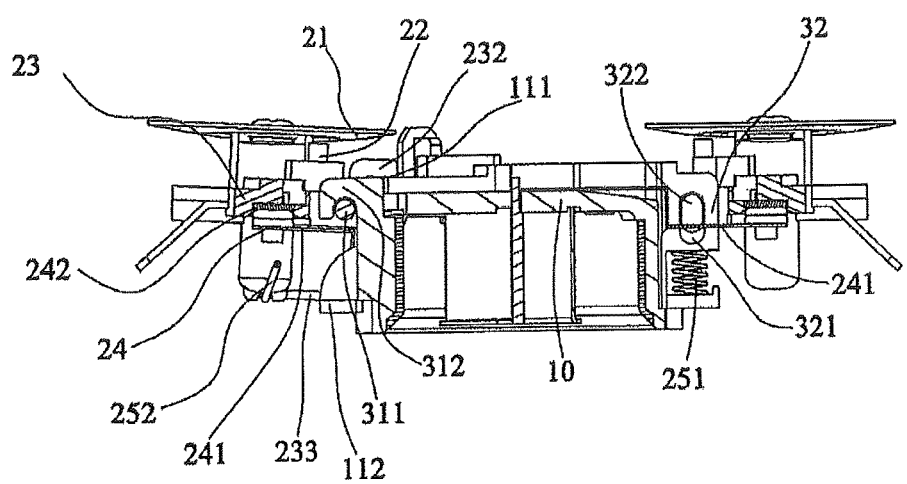
Figure 6:
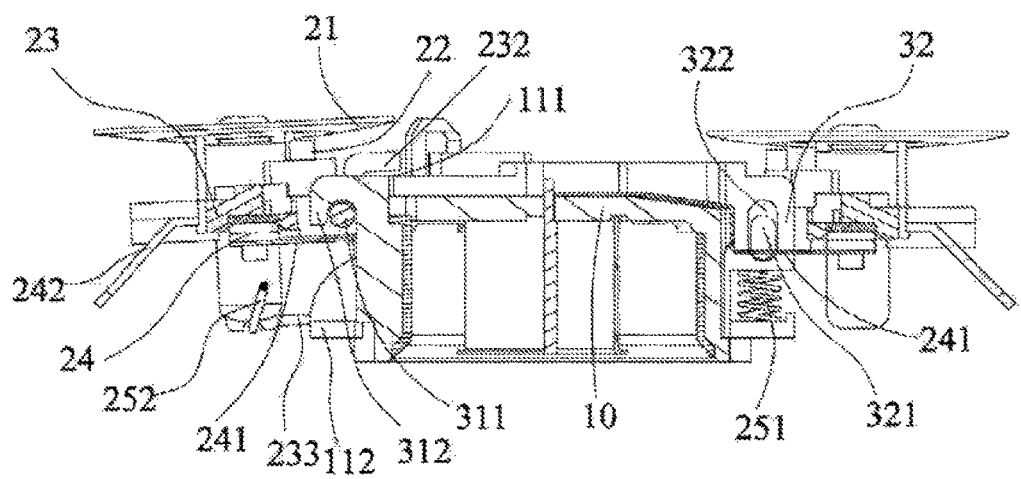

As shown in FIGS. 5 and 6, when the temperature control apparatus 100 is mounted, the elastomer 25 provides elastic force, so that the thermosensitive protective action component 20 is pushed to the limiting position (as shown in FIG. 5) where it has good thermal contact with the temperature sensing surface of the liquid heater. At this moment, the fixed contact piece 242 contacts the movable contact piece 241.

When the temperature control apparatus 100 starts working, the metal actuator 21 acts and the acting mechanism 22 contacts the metal actuator 21 and bears force, so that the switch contact set 24 is disenabled, whereby the movable contact piece 241 can be separated from the fixed contact piece 242. When the temperature sensing surface of the liquid heater deforms, the elastomer 25 pushes the thermosensitive protective action component 20 to the position where it has good thermal contact with the temperature sensing surface of the liquid heater. In this case, defective tightness of the contact between the thermosensitive protective action component 20 and the temperature sensing surface caused by the deformation of the temperature sensing surface can be avoided, so that the liquid heater would not fail or burn out.

FIGS. 5 and 6 respectively show two limiting positions of the thermosensitive protective action component 20 relative to the housing 10. As shown in FIG. 5, when deformation in a shape of protrusions on both sides occurs on the temperature sensing surface relative to a mounting surface, the housing 10 is immobile relative to the temperature sensing surface, and the thermosensitive protective action component 20 is mobile. In this case, the thermosensitive protective action component 20 is pushed by the elastomer 25 to move upward relative to the housing 10, so that the deformation in the shape of protrusions on both sides of the temperature sensing surface can be compensated. Since the movable contact piece 241 is elastic, thereby providing elastic support needed by the switch contact set 24 within a scope (between two limiting positions) of movement of the thermosensitive protective action component 20. A touch point between the movable contact piece 241 and the fixed contact piece 242 changes position with the movement of the thermosensitive protective action component 20. However, requirement for quality of contact will not be influenced by the contact effect. Based on actual deformation, the limiting position can be adjusted to a suitable position, so that the temperature control apparatus 100 can be well adaptable. If the deformation is not beyond the limiting position, the temperature control apparatus 100 can still have good contact with the liquid heater, and protective performance of the temperature control apparatus 100 will not deteriorate. As shown in a left portion of FIG. 5, the thermosensitive protective action component 20 turns right relative to the housing 10, so that the first blocking rib 232 abuts against the first limiting rib 111. As shown in a right portion of FIG. 5, the thermosensitive protective action component 20 turns left relative to the housing 10, so that the sliding block 322 is placed at a highest position of the slideway 321, which is one of the limiting positions of the two sets of thermosensitive protective action component 20.

As shown in FIG. 6, when deformation in a shape of concaves on both sides occurs on the temperature sensing surface relative to the mounting surface, the housing 10 is immobile relative to the temperature sensing surface, while the thermosensitive protective action component 20 is mobile. In this case, the thermosensitive protective action component 20 compresses the elastomer 25 downward relative to the housing 10, so that the deformation in the shape of concaves on both sides of the temperature sensing surface can be compensated. The movable contact piece 241 is elastic, thereby providing elastic support needed by the switch contact set 24 within a scope (between two limiting positions) of movement of the thermosensitive protective action component 20. A touch point between the movable contact piece 241 and the fixed contact piece 242 changes position with the movement of the thermosensitive protective action component 20. However, requirement for quality of contact will not be influenced by the contact effect. Accordingly, the elasticity of the movable contact piece 241 becomes larger, but it does not exceed an actuating force of the metal actuator 21 in actual manufacturing process. Therefore, an operation of the thermosensitive protective action component 20 will not be influenced. Based on actual deformation, the limiting position can be adjusted to a suitable position, so that the temperature control apparatus 100 can be well adaptable. If the deformation is not beyond the limiting position, the temperature control apparatus 100 still has good contact with the liquid heater, and protective performance of the temperature control apparatus 100 will not deteriorate. As shown in a left portion of FIG. 6, the thermosensitive protective action component 20 turns left relative to the housing 10, so that the first blocking rib 232 moves away from the first limiting rib 111, and the second blocking rib 233 abuts against the second limiting rib 112. As shown in a right portion of FIG. 6, the thermosensitive protective action component 20 moves downward relative to the housing 10, so that the sliding block 322 is placed at a lowest position of the slideway 321, which is the other limiting position of the two sets of thermosensitive protective action component 20. The two sets of thermosensitive protective action component 20 each can move relative to the housing 10 between the two limiting positions thereof.

The thermosensitive protective action component 20 moves relative to the housing 10 as the deformation of the temperature sensing surface, and bears the pressure from the elastomer 25 all the time. However, in the existing process, the metal actuator 21 of the thermosensitive protective action component 20 cannot sustain much pressure, or else the sensitivity and active temperature of the metal actuator 21 will be influenced. According to an example of the present disclosure, the support frame 23 of the thermosensitive protective action component 20 is further provided with a positioning mechanism (not shown), which can be disposed near a cross head screw positioned at a tongue tip of the metal actuator 21 as shown in FIG. 2, for contacting a electric heating surface (i.e., the temperature sensing surface) and bearing pressure from the thermosensitive protective action component 20, so that the metal actuator 21 can be in contact with the electric heating surface, but is not under any force. As a result, the sensitivity and active temperature of the metal actuator 21 can be guaranteed unchanged.

Therefore, the temperature control apparatus 100 according to the present disclosure has the following advantages as compared with the existing apparatus.

First, as the housing 10 and the thermosensitive protective action component 20 according to the present disclosure are movably connected, when the liquid heater is deformed as a result of a thermal shock, a good thermal contact can be maintained between the thermosensitive protective action component 20 and a temperature sensing surface on a bottom of a container of the liquid heater, thus ensuring the reliability of temperature sensing.

Second, the temperature control apparatus 100 can adapt to installation requirements of the temperature sensing surface with varying degrees of deformation, so that it can be more universally applied, whereby requirements for the precision of the liquid heater can be lowered, and process cost can be reduced accordingly.

Further, the housing 10 of the temperature control apparatus is fixedly connected with the liquid heater, so that an overall strength of the liquid heater can be guaranteed. As a result, a mounting strength of the liquid heater can be improved, and requirements for higher connecting strength can be satisfied.

The housing 10 and the thermosensitive protective action component 20 can be flexibly connected, so that a size of the temperature control apparatus 100 can be reduced under the condition that the mounting strength is not evidently changed, whereby resource consumption and costs can be reduced.

The above embodiments are described only for better understanding, rather than restricting, the present disclosure. Any person skilled in the art can make amendments to the implementing forms or details without departing from the spirit and scope of the present disclosure. The scope of the present disclosure should still be subject to the scope defined in the claims.

The invention claimed is:

1. A temperature control apparatus, comprising a housing and at least one set of thermosensitive protective action component, wherein
the thermosensitive protective action component comprises a metal actuator, an acting mechanism, and a switch contact set, the acting mechanism controlling an on-off state of the switch contact set, and the switch contact set comprising a movable contact piece and a fixed contact piece, and
the temperature control apparatus further comprises a connecting component, via which the housing and the thermosensitive protective action component are flexibly connected with each other.

2. The temperature control apparatus according to claim 1, wherein the movable contact piece is disposed on the housing, and the fixed contact piece is disposed on the thermosensitive protective action component.

3. The temperature control apparatus according to claim 1, wherein the thermosensitive protective action component is provided with a shaft and the housing is provided with shaft sleeve, and the thermosensitive protective action component is in shaft joint with the housing through coordination between the shaft and the shaft sleeve.

4. The temperature control apparatus according to claim 1, wherein a sliding block is disposed on the thermosensitive protective action component and a slideway is disposed on the housing, wherein the sliding block is disposed in the slideway, so that the thermosensitive protective action component can move up and down relative to the housing.

5. The temperature control apparatus according to claim 3, wherein the housing is provided with no fewer than two limiting ribs, and blocking ribs are disposed on the thermosensitive protective action component at positions corresponding to the limiting ribs, wherein the limiting ribs coordinate with the blocking ribs, so that the thermosensitive protective action component has no fewer than two limiting positions.

6. The temperature control apparatus according to claim 1, wherein the thermosensitive protective action component comprises an elastic member, a part of the elastic member being fixed to the housing and an other part thereof being fixed to the thermosensitive protective action component.

7. The temperature control apparatus according to claim 6, wherein the elastic member is used for providing thrust to push the thermosensitive protective action component to a limiting position where it has good thermal contact with a temperature sensing surface of a liquid heater.

8. The temperature control apparatus according to claim 2, wherein the movable contact piece is elastic, so as to provide elastic support needed by the switch contact set in a scope of movement of the thermosensitive protective action component.

9. The temperature control apparatus according to claim 6, wherein the thermosensitive protective action component is provided with a positioning component, which is mounted near the metal actuator and used to bear force from the elastic member.

10. A liquid heater, comprising a container and a base configured and arranged to coordinate with and heat the container, wherein a temperature control apparatus according to claim 1 is mounted in a bottom of the container.

* * * * *